(12) United States Patent
Dandan et al.

(10) Patent No.: US 11,105,557 B2
(45) Date of Patent: Aug. 31, 2021

(54) HEAT EXCHANGER, TANK FOR HEAT EXCHANGER, AND METHOD OF MAKING THE SAME

(71) Applicant: Modine Manufacturing Company, Racine, WI (US)

(72) Inventors: Issa Dandan, Kenosha, WI (US); Thomas Michael Best, Racine, WI (US); Zachary Ouradnik, Racine, WI (US)

(73) Assignee: MODINE MANUFACTURING COMPANY, Racine, WI (US)

(*) Notice: Subject to any disclaimer, the term of this patent is extended or adjusted under 35 U.S.C. 154(b) by 1287 days.

(21) Appl. No.: 14/830,810

(22) Filed: Aug. 20, 2015

(65) Prior Publication Data

US 2016/0054067 A1    Feb. 25, 2016

Related U.S. Application Data

(60) Provisional application No. 62/040,501, filed on Aug. 22, 2014.

(51) Int. Cl.
*B23P 15/26*        (2006.01)
*F28D 1/053*        (2006.01)
(Continued)

(52) U.S. Cl.
CPC .......... *F28D 1/05366* (2013.01); *B23P 15/26* (2013.01); *F28D 1/0366* (2013.01);
(Continued)

(58) Field of Classification Search
USPC ....................................................... 165/153
See application file for complete search history.

(56) References Cited

U.S. PATENT DOCUMENTS 2,899,177 A * 8/1959 Harris et al. ........... B21D 53/04
                                                          165/153
4,775,006 A   10/1988 Suddeutsche et al.
(Continued)

FOREIGN PATENT DOCUMENTS

CN      1087168        5/1994
DE      10347180 A1    5/2005
(Continued)

OTHER PUBLICATIONS

JP 2006317101 A translation.*
(Continued)

*Primary Examiner* — Jianying C Atkisson
*Assistant Examiner* — Paul S Schwarzenberg
(74) *Attorney, Agent, or Firm* — Michael Best & Friedrich LLP

(57) ABSTRACT

A tank for a heat exchanger includes an extruded tank section having a generally constant extrusion profile extending in a longitudinal direction from a first tank end to a second tank end. A first planar end cap is joined to the extruded tank section near the first tank end, and a second planar end cap is joined to the extruded tank section near the second tank end. Together, the extruded tank section and first and second end caps can at least partially define an internal tank volume. The first and second planar end caps are both arranged at non-perpendicular angles to the longitudinal direction.

18 Claims, 5 Drawing Sheets

(51) Int. Cl.
  *F28D 1/03*   (2006.01)
  *F28F 1/04*   (2006.01)
  *F28F 1/12*   (2006.01)
  *F28F 9/02*   (2006.01)
  *F28D 21/00*   (2006.01)

(52) U.S. Cl.
  CPC ............... *F28F 1/04* (2013.01); *F28F 1/126* (2013.01); *F28F 9/02* (2013.01); *F28D 2021/0049* (2013.01); *F28F 2220/00* (2013.01); *F28F 2255/16* (2013.01)

(56) References Cited

U.S. PATENT DOCUMENTS

| | | | |
|---|---|---|---|
| 4,928,755 A | 5/1990 | Doty et al. | |
| 5,062,476 A * | 11/1991 | Ryan | F28D 1/05383 165/149 |
| 5,127,466 A * | 7/1992 | Ando | F28F 9/002 165/153 |
| 5,257,662 A * | 11/1993 | Osborn | F28F 9/001 165/149 |
| 5,325,914 A * | 7/1994 | Tanaka | F28F 9/002 165/149 |
| 5,327,957 A | 7/1994 | Killebrew | |
| 5,481,800 A | 1/1996 | Hutto et al. | |
| 5,582,239 A | 12/1996 | Tsunoda et al. | |
| 5,607,012 A * | 3/1997 | Buchanan | F28F 9/0212 165/173 |
| 5,904,206 A * | 5/1999 | Kroetsch | F28D 1/0535 165/173 |
| 5,975,197 A | 11/1999 | Kado | |
| 6,095,239 A * | 8/2000 | Makino | F28D 1/0435 165/135 |
| 6,176,303 B1 | 1/2001 | Kobayashi et al. | |
| 6,273,182 B1 * | 8/2001 | Pautler | F28D 1/0435 165/140 |
| 6,830,100 B2 * | 12/2004 | Gowan | F28F 9/0212 165/153 |
| 7,152,669 B2 | 12/2006 | Kroetsch et al. | |
| 7,604,044 B2 | 10/2009 | Kawakubo et al. | |
| 8,210,246 B2 | 7/2012 | Bhatti et al. | |
| 8,561,678 B2 | 10/2013 | Richardson et al. | |
| 2002/0084064 A1 | 7/2002 | Rhodes et al. | |
| 2004/0069468 A1 * | 4/2004 | Lamich | F28F 9/001 165/148 |
| 2004/0079516 A1 * | 4/2004 | Leeson | B63H 21/10 165/44 |
| 2005/0109492 A1 * | 5/2005 | Kroetsch | F28D 1/05366 165/149 |
| 2008/0128120 A1 | 6/2008 | Wang | |
| 2008/0202735 A1 | 8/2008 | Geskes et al. | |
| 2010/0300667 A1 | 12/2010 | Samuelson | |
| 2012/0118544 A1 * | 5/2012 | Ciaffarafa | F28F 9/0219 165/157 |

FOREIGN PATENT DOCUMENTS

| | | | |
|---|---|---|---|
| GB | 2049149 A | 12/1980 | |
| JP | 674684 A | 3/1994 | |
| JP | 2005127630 A | 5/2005 | |
| JP | 2006-317101 | 11/2006 | |
| JP | 2006317101 A * | 11/2006 | ........... F28D 1/0435 |

OTHER PUBLICATIONS

First Office Action from the State Intellectual Property Office of China for Application No. 201510519252.X dated Feb. 4, 2017 (17 pages).
Chinese Patent Office Action for Application No. 201510519252.X dated Mar. 22, 2018 (15 pages, English translation included).
German Patent Office Action for Application No. 102015010288.5 dated Mar. 14, 2019 (2 pages).
Examination Report Under Sections 12 & 13 of the Patents Act, 1970 and the Patents Rules, 2003 for Indian Patent Application No. 2418/DEL/2015 dated May 24, 2019, Intellectual Property India (7 pages).

* cited by examiner

HEAT EXCHANGER, TANK FOR HEAT EXCHANGER, AND METHOD OF MAKING THE SAME

CROSS-REFERENCE TO RELATED APPLICATIONS

This application claims priority to U.S. Provisional Patent Application No. 62/040,501, filed Aug. 22, 2014, the entire contents of which are hereby incorporated by reference.

BACKGROUND

Heat exchangers are used to transfer thermal energy from one stream of fluid at a first, higher temperature to another stream of fluid at a second, lower temperature. Oftentimes such heat exchangers are used to remove waste heat from a process fluid such as oil, coolant, or the like by transferring that heat to a flow of cooler air directed to pass through the heat exchanger.

In certain applications, the process fluid to be cooled is also at an operating pressure that is substantially greater than the ambient atmospheric pressure of the heat exchanger's surroundings. As a result, it becomes necessary for the heat exchanger to be designed to withstand the pressure forces that result from the process fluid passing through the heat exchanger. This can become challenging, especially in cases where the heat exchanger is to be used in large systems and machinery such as, for example, construction equipment, agricultural machines, and others. As the size of the machine or system increases, the flow rate of the process fluid also increases, necessitating larger heat exchangers to accommodate both the heat transfer requirements and the fluid flow rates. Such larger heat exchangers can have substantially large surface areas exposed to the pressure of the process fluid, especially in tank areas, and the force of the fluid pressure acting on these large surfaces can lead to destructive mechanical stresses in the heat exchanger structure.

An example of such a heat exchanger as known in the art is depicted in FIG. 1. The heat exchanger 101 is of a bar and plate construction, and can be used as, for example, an oil cooler for an off-highway vehicle such as an excavator, wheel loader, combine, etc. Oil to be cooled by the heat exchanger 101 travels through a plurality of channels provided within a heat exchanger core 102, those channels alternatingly with channels for cooling air that is directed in a cross-flow orientation to the oil through the core 102. Tanks 103 are provided at either end of the core 102 to direct the oil to and from the core 102, and inlet/outlet ports 106 are provided at each of the tanks 103 to fluidly couple the heat exchanger 101 to the oil circuit.

The tanks 103 must be sized to be large enough to evenly distribute the flow of oil to the individual channels. As a result, substantially large surface areas within the tank are exposed to the typically high pressure of the oil, and must be designed to be capable of withstanding such forces. A typical tank construction for such high-pressure applications includes an extruded tank section 104 with an arcuate (e.g. cylindrical) internal profile in order to evenly distribute the forces resulting from the pressure loading. Flat end caps 105 are welded to the ends of the extruded tank section 104 in order to close off the ends of the tank 103. Those flat end caps 105 must again be designed with a thickness that is suitable for withstanding the pressure forces imposed on them by the fluid in the tank 103. Such a tank construction can be more economical than a tooled cast tank for low-volume manufacturing.

The inventors have found that, even when such heat exchangers have been designed with wall sections suitable for withstanding the elevated operating pressure of the intended application, the forces acting on the end caps can result in undesirable and damaging stresses in the remainder of the heat exchanger. Thus, there is still room for improvement.

SUMMARY

In some embodiment of the invention, a tank for a heat exchanger includes an extruded tank section having a generally constant extrusion profile extending in a longitudinal direction from a first tank end to a second tank end, a first planar end cap joined to the extruded tank section near the first tank end, and a second planar end cap joined to the extruded tank section near the second tank end. The extruded tank section and first and second end caps together at least partially define an internal tank volume. The first and second planar end caps are both arranged at non-perpendicular angles to the longitudinal direction.

In some embodiments the first end cap is at least partially recessed from the first tank end and the second end cap is at least partially recessed from the second tank end. Some embodiments include at least one mounting hole extending through the extruded tank section without passing through the internal tank volume, and in some such embodiments the mounting hole is located between the first planar end cap and the first tank end.

In some embodiments the generally constant extrusion profile includes first and second opposing, generally planar external surfaces joined by a third generally planar external surface perpendicular to the first and second generally planar external surfaces, and a cylindrical internal surface. Each of the first and second planar end caps includes an elliptical edge corresponding to a conic section of the cylindrical internal surface.

In some embodiments of the invention, a method of making a tank for a heat exchanger, includes: extruding a tank section having a generally constant extrusion profile extending in a longitudinal direction; cutting the extruded tank section to predetermined lengths along the longitudinal direction; forming flat end caps from a sheet of material, each of the flat end caps having first and second opposing faces spaced apart by a thickness of the material; inserting a first flat end cap within one of the predetermined lengths of the extruded tank section so that the longitudinal direction is at a non-zero angle to the first and second opposing faces of the first flat end cap; inserting a second flat end cap within that one predetermined length of the extruded tank section so that the longitudinal direction is at a non-zero angle to the first and second opposing faces of the second flat end cap; and joining the first and second flat end caps to the extruded tank section.

In some embodiment of the invention, a heat exchanger includes a plurality of fluid flow channels extending in parallel from a wall, and a tank sealingly joined to the wall to together define a tank volume. Internal surfaces of the tank volume are exposed to pressure forces from the fluid passing through the plurality of fluid flow channels. The tank includes an extruded tank section having a generally constant extrusion profile extending in a longitudinal direction from a first tank end to a second tank end, a first planar end cap joined to the extruded tank section near the first tank end and arranged at a non-perpendicular angle to the wall, and a second planar end cap joined to the extruded tank section near the second tank end and arranged at a non-perpendicular angle to the wall.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
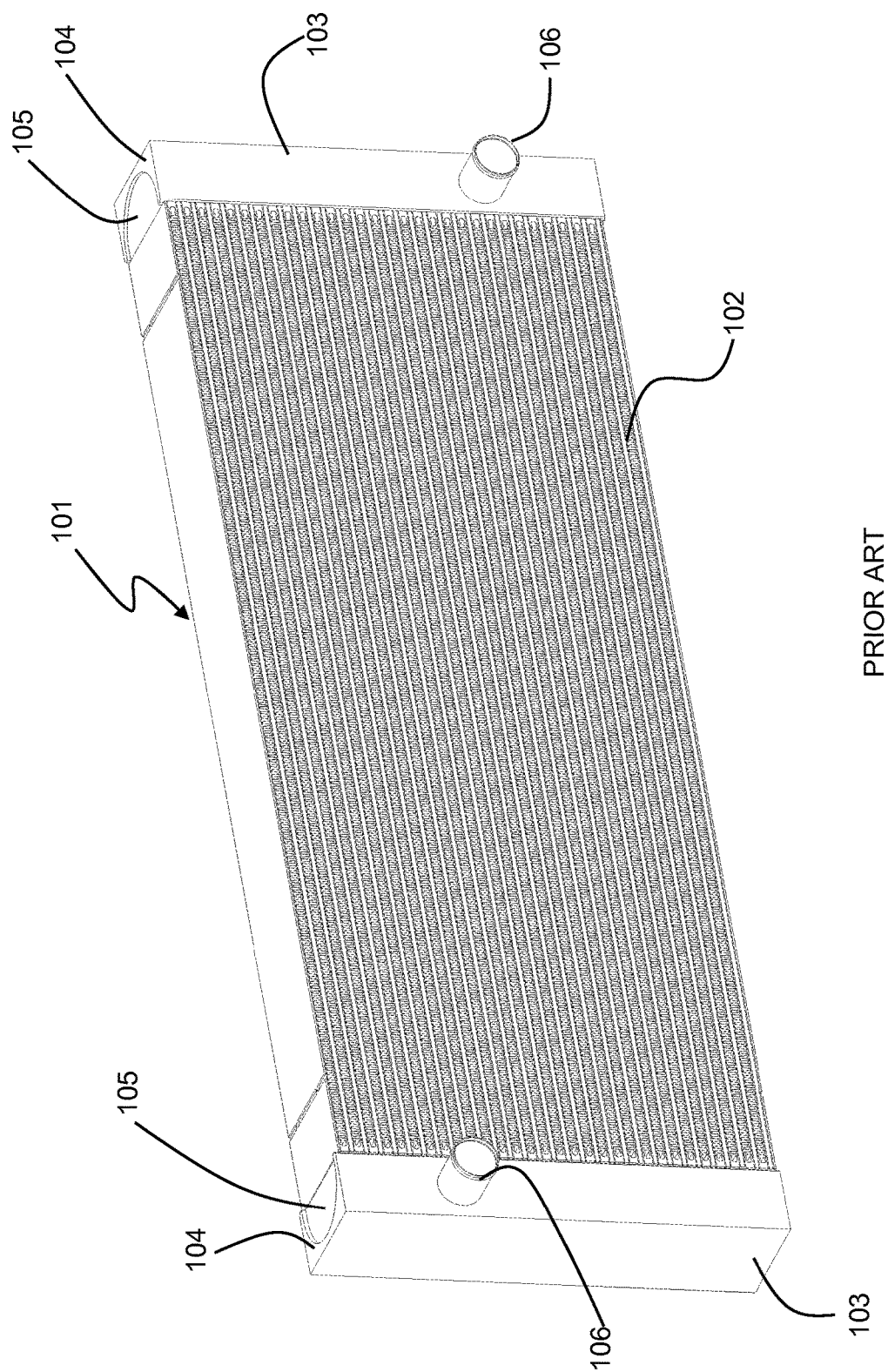
FIG. 1 is a perspective view of a prior art heat exchanger.
Figure 2:
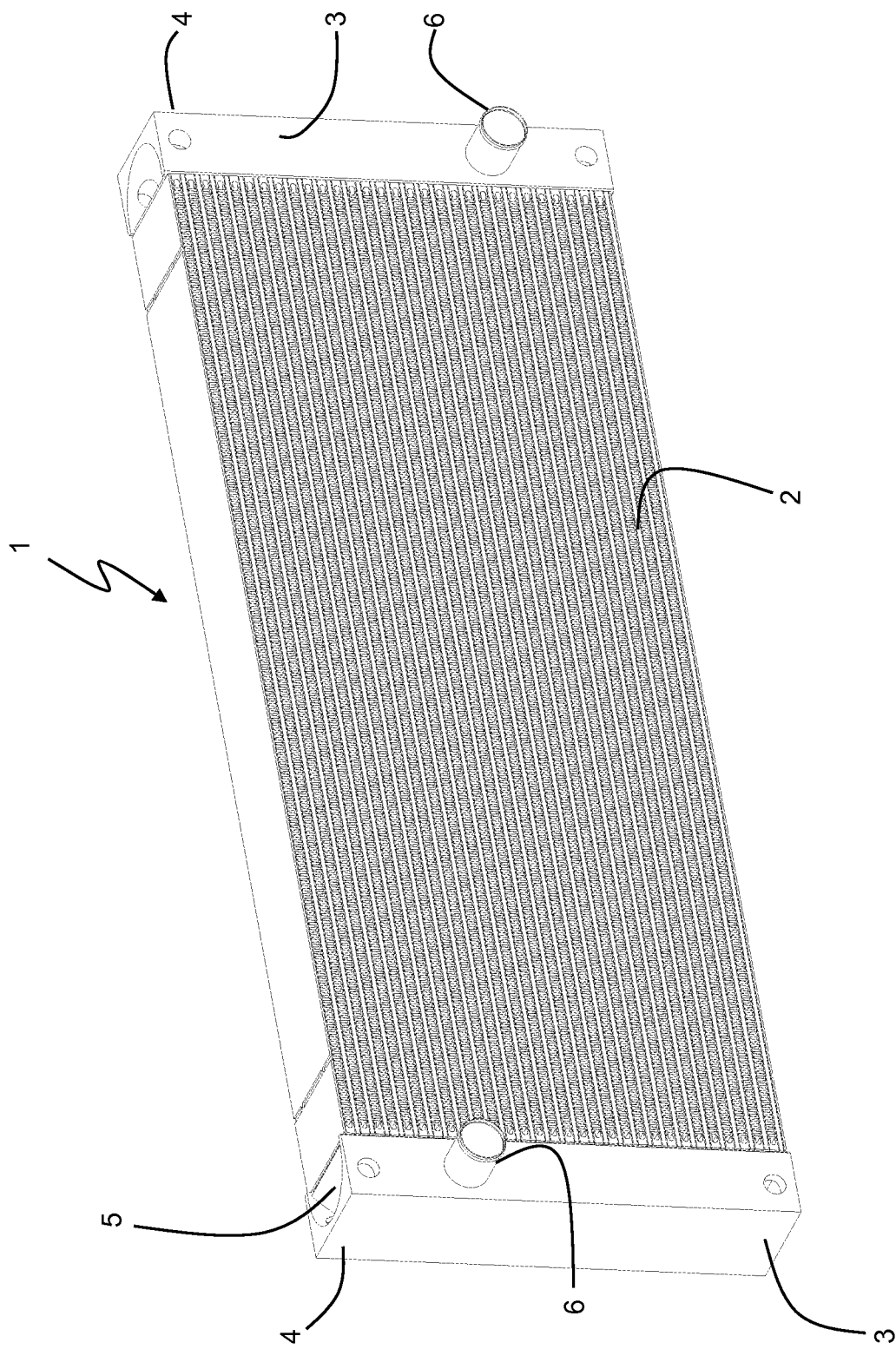
FIG. 2 is a perspective view of a heat exchanger according to an embodiment of the invention.
Figure 3:
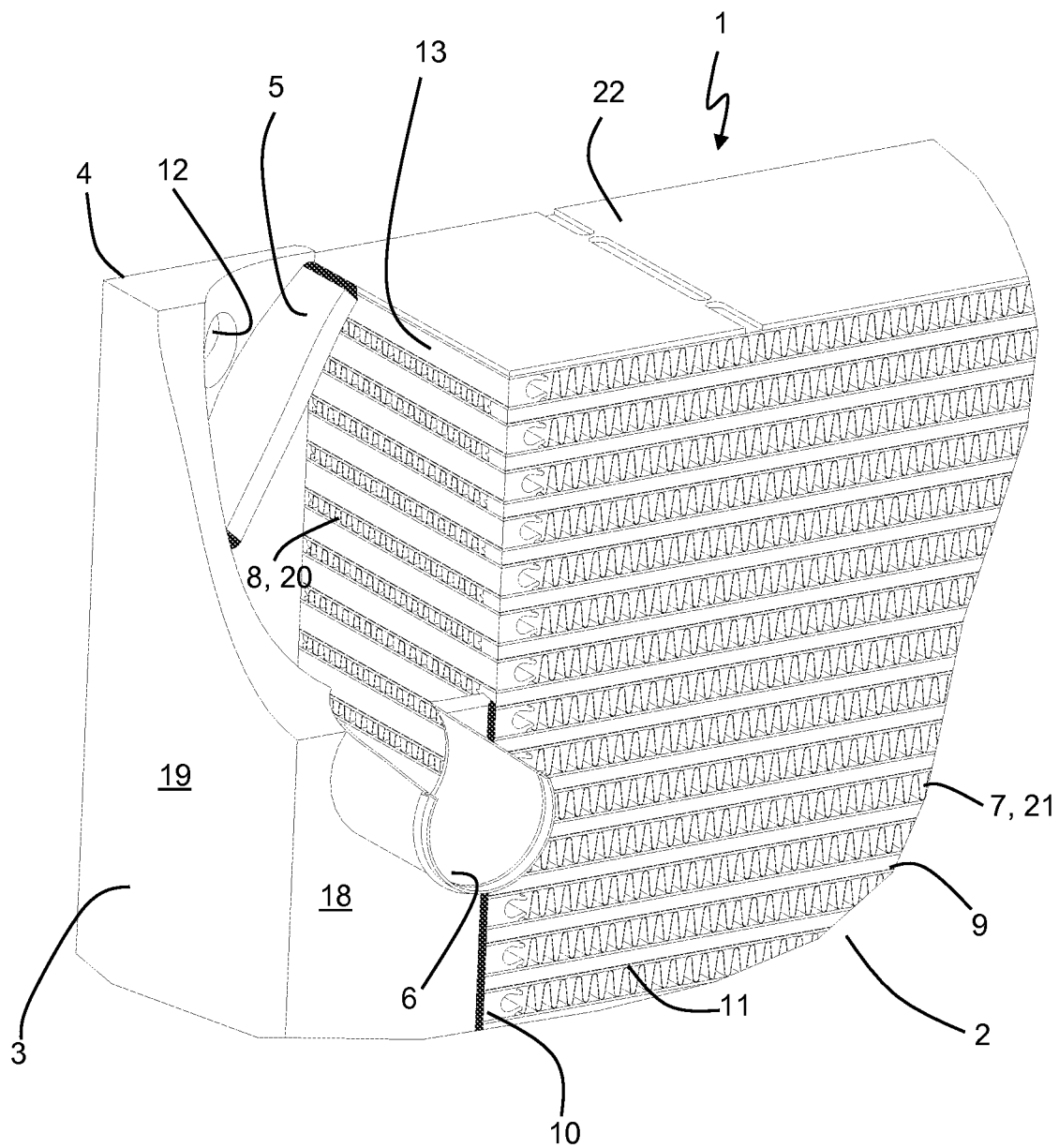
FIG. 3 is a cut-away partial perspective view of the heat exchanger of FIG. 2.
Figure 7:
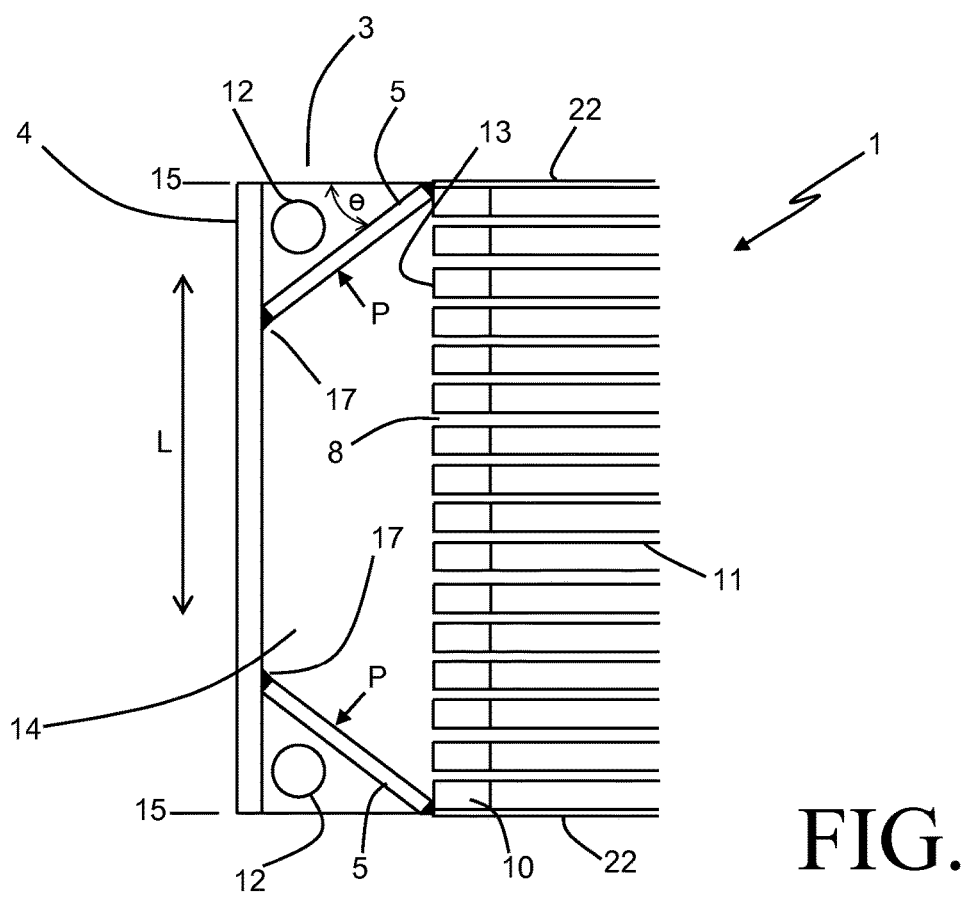
FIG. 7 is a diagrammatic plan section view of a portion of the heat exchanger of FIG. 2.

A heat exchanger 1 embodying the present invention is shown in FIGS. 2, 3, and 7, and can provide durability advantages over other known heat exchangers when used in high-pressure applications such as oil cooling, charge-air cooling, and the like. For purposes of description, reference will be made to the heat exchanger 1 as being an air-cooled oil cooler to be used for the cooling of engine oil, but it should be understood that the invention can find applicability in other heat exchanger applications as well.

The heat exchanger 1 is of a bar-plate construction, with a brazed heat exchanger core 2 defining alternating passages for the flow of oil and cooling air. As best seen in FIG. 3, the core 2 is formed by stacking flat separator plates 11 spaced apart alternatingly by long bars 9 and short bars 10 to define alternating oil passages 8 and air passages 7. The oil passages 8, bounded by long bars 9 arranged at opposing air inlet and outlet faces of the heat exchanger 1, extend in the heat exchanger width direction. The air passages 7, bounded by short bars 10 arranged at opposing tank ends of the heat exchanger 1, extend in the heat exchanger depth direction, so that the oil passages 8 and air passages 7 are arranged to be perpendicular to one another, resulting in a cross-flow heat exchange orientation. Oil inserts 20 are arranged between the separator plates 11 in the oil passages 8, and air fins 21 are arranged between the separator plates 11 in the air passages 7. The oil inserts 20 and air fins 21 provide heat transfer enhancement through additional heat exchange surface area and flow turbulation for their respective fluids, as well as provide structural support to the separator plates in order to withstand the pressurization forces imposed by the fluids. The core 2 is bounded by side plates 22 at both the top and bottom ends of the stack.

Figure 4:
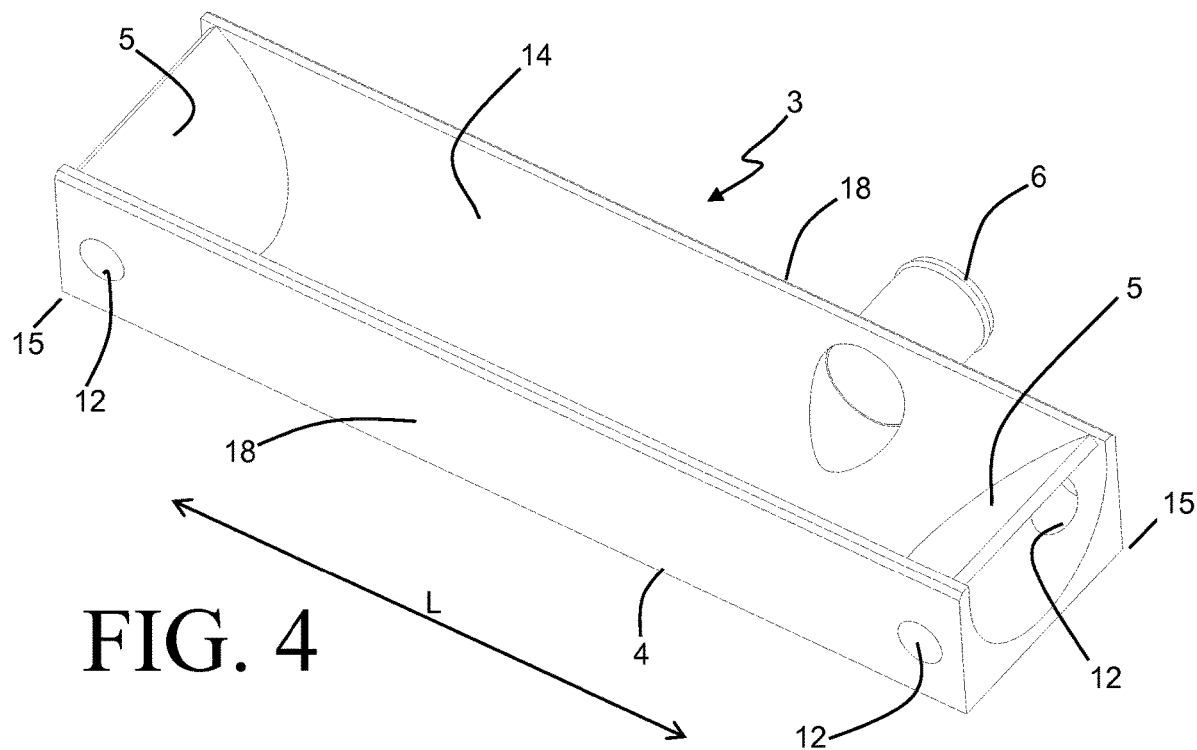
FIG. 4 is a perspective view of a tank to be used in the heat exchanger of FIG. 2 according to some embodiments of the invention.
Figure 5:
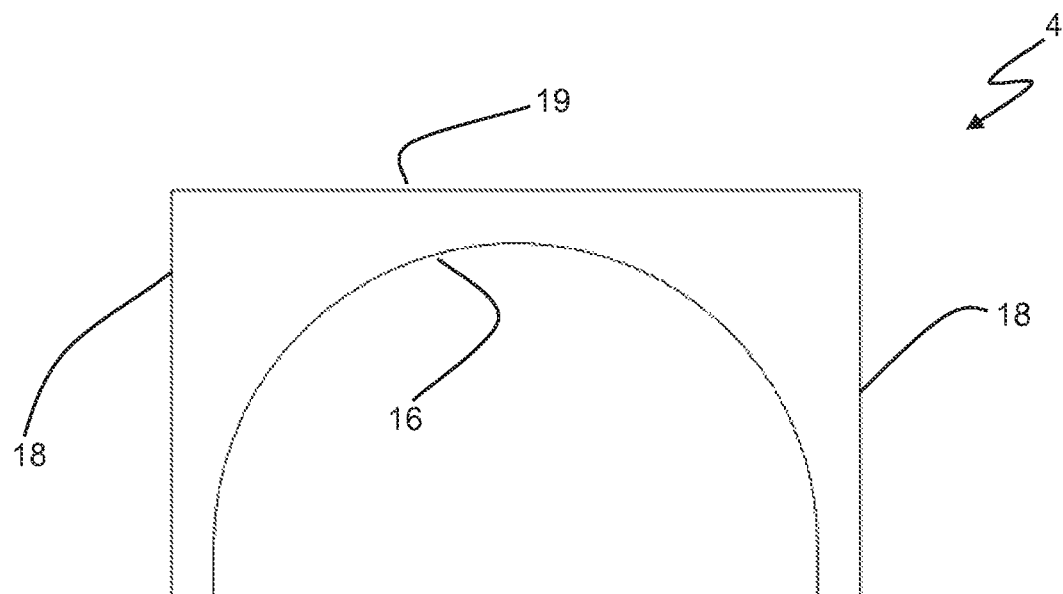
FIG. 5 is a plan view showing an extrusion profile used in the tank of FIG. 4.
Figure 6:
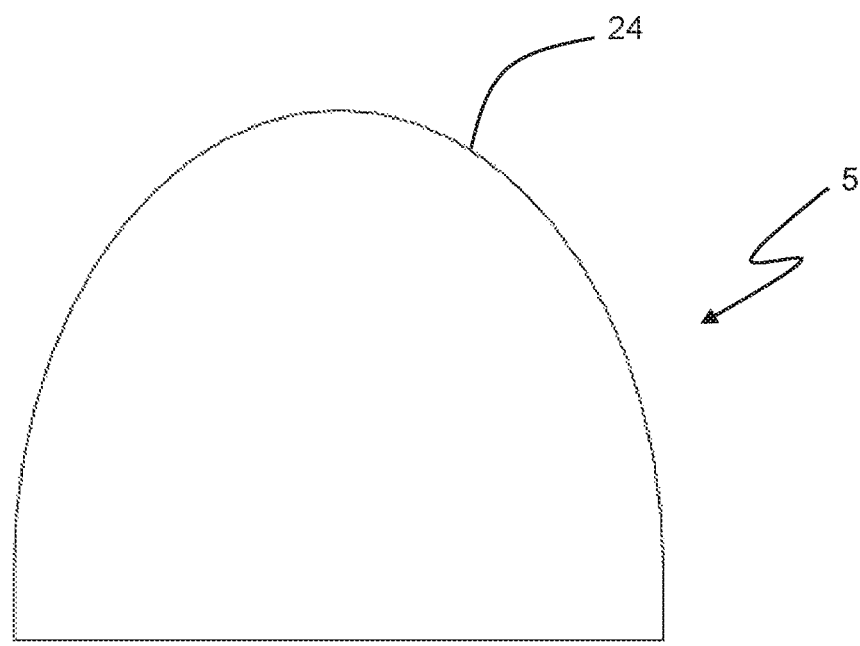
FIG. 6 is a plan view of an end cap used in the tank of FIG. 4.

Flat sides of the short bars 10, ends of the long bars 9, and edges of the separator plates 11 and side plates 22 together form a generally planar wall 13 at each tank end of the core 102. Inlet and outlet tanks 3 are welded to the walls 13 to provide inlet and outlet manifolding for the oil flowing through the oil passages 8. Details of a representative tank 3 are shown in FIGS. 4-6, and will now be described in greater detail with reference to those figures and FIGS. 2, 3, and 7.

In order to withstand the elevated pressure forces imposed by the oil or other pressurized fluid traveling through the heat exchanger 1, the tank 3 is formed as a welded assembly, preferably of an aluminum alloy, although other metals could be substituted if required for the application. The tank 3 is of a box-like construction, with three of the sides provided by an extruded tank section 4, the profile of which is shown in FIG. 5. The extruded tank section 4 extends in a longitudinal direction (indicated by the double-ended arrow labeled "L" in FIG. 4) and includes a pair of opposing sides 18 spaced apart to define a tank width approximately equal to the depth of the heat exchanger core 2, joined by a third side 19 to form the outer perimeter of the box-like tank. A fluid inlet or outlet port 6 is provided through one of the side walls 18, although such a port 6 could alternatively be provided through the side wall 19. A cylindrical surface 16 is provided in the interior of the tank section 4 extending along the length direction L so that internal pressure forces are resolved primarily as membrane stresses in the tank section 4, rather than as bending stresses. Such a configuration can provide enhanced durability to the tank 3 when the fluid passing through the channels 8 of the heat exchanger 1 is at a pressure that is substantially elevated over the ambient pressure.

The tank 3 further includes a pair of planar end caps 5 arranged at opposing ends 15 of the extruded tank section 4. The planar end caps 5 are arranged to be non-perpendicular to the longitudinal direction of the extruded tank section 4. As best seen in FIG. 7, the deviation from perpendicular can be expressed in terms of an angle $\theta$, and in at least some preferable embodiments the deviation from perpendicular is at least 55°. The planar end caps 5 can be economically produced by cutting the desired profile from a sheet of metal material by, for example, laser cutting or water jet cutting. The desired profile of the end cap 5 can include an elliptical edge 24 that corresponds to a conic section of the cylindrical surface 16 of the extruded tank section 4, when that cylindrical surface 16 is intersected by a plane at the desired angle of deviation from perpendicular. Such a profile will enable a repeatable and closely matched alignment between the end cap 5, at the desired angle, and the extruded tank section 4 so as to allow for joining of the end cap 5 and the tank section 4 by welding or other similar joining processes. In some embodiments, welding of the end cap 5 to the extruded tank section 4 is simplified by placing a weld bead 17 on the inwardly facing side of the tank 4, i.e. on that side which eventually faces the internal volume 14 of the tank 3.

The inventors have found that arranging the end caps 5 at such a non-perpendicular angle to the longitudinal direction of the extruded tank section 4 leads to a reduction of tensile stress within the flow inserts 20 at the tank mounting wall 13. As pressure forces are exerted by the fluid within the internal volume 14 onto the flat surfaces of the end caps 5, these pressure forces result in tensile stresses in the longitudinal direction L within the wall 13. The inventors have found that, when the end caps are oriented to be perpendicular to the longitudinal direction (as in the prior art heat exchanger 101), such tensile stresses can result in structural fatiguing of the inserts 20 and, consequently, an inability to maintain the shape of the flow channels 8, resulting in pressure failure of the heat exchanger. Such undesirable results have in the past been addressed by adding multiple gussets between the perpendicular end cap and the internal tank walls. However, such added parts introduce undesirable cost and complexity to the manufacturing process.

By angling the end caps 5, the pressure forces (indicated by the arrows labeled "P" in FIG. 7) act on the faces of the end cap at an angle to the longitudinal direction L, that angle being of the same value as the angle θ at which the end cap 5 is oriented. The resultant stresses imposed upon the heat exchanger 1 by those pressure forces will include a component that acts in the longitudinal direction within the wall 13 and imposes the damaging tensile stresses upon the inserts 20, that component of the pressure force being decreased as the angle θ increases. Through computational analysis, the inventors have determined that the resultant stresses in the inserts 20 (which are known to be the weak spot with respect to tank pressurization) are substantially reduced over a comparative design with a gusseted perpendicular end cap.

In some embodiments of the invention, mounting features for the heat exchanger 101 are incorporated within the footprint of the tanks 3. Mounting holes 12 can be machined into the extruded tank section 3 (such as by drilling, milling, or other machining processes). Such a mounting hole 12 can be advantageously located within the triangular region between the end cap 5 and the corresponding end 15 of the tank section 3, so that mounting hardware can pass through the mounting hole 12 without needing to pass through the internal volume 14 of the tank 3, thereby avoiding the possibility of fluid leakage through the mounting hole 12. In some preferable embodiments, the mounting hole 12 passes through both side walls 18 of the extruded tank section 4, so that mounting hardware such as a bolt or the like can pass through the tank 3 in order to secure the heat exchanger 101. In some embodiments, a cylindrical tube can be inserted through the mounting hole 12 and welded to the tank 3 in order to provide further support for the mounting.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A tank for a heat exchanger, comprising:
an extruded tank section having a generally constant extrusion profile extending in a longitudinal direction from a first tank end to a second tank end, the extrusion profile including an internal surface;
a first planar end cap having a first end cap edge that is joined to the internal surface of the extruded tank section near the first tank end to close off the first tank end along the first end cap edge; and
a second planar end cap having a second end cap edge that is joined to the internal surface of the extruded tank section near the second tank end to close off the second tank end along the second end cap edge, the extruded tank section and first and second end caps together at least partially defining an internal tank volume,
wherein the first and second planar end caps are both arranged at non-perpendicular angles to the longitudinal direction.

2. The tank of claim 1, wherein the first end cap is at least partially recessed from the first tank end and the second end cap is at least partially recessed from the second tank end.

3. The tank of claim 1, further comprising at least one mounting hole extending through the extruded tank section without passing through the internal tank volume wherein the at least one mounting hole is located between the first planar end cap and the first tank end.

4. The tank of claim 1, wherein the generally constant extrusion profile includes first and second opposing, generally planar external surfaces joined by a third generally planar external surface perpendicular to the first and second generally planar external surfaces, wherein the internal surface of the extrusion profile is cylindrical, and wherein each of the first end cap edge and the second end cap edge defines a non-circular elliptical edge corresponding to a conic section of the cylindrical internal surface.

5. The tank of claim 1, wherein an inwardly facing face of each of the first and second planar end caps is angled at least 55 degrees from perpendicular to the longitudinal direction.

6. The tank of claim 1, wherein the first and second planar end caps are joined to the extruded tank section by weld joints located within the internal tank volume.

7. A heat exchanger comprising a plurality of fluid flow channels extending in parallel from a planar wall, and a tank sealingly joined to the wall to together define a tank volume, the tank comprising:
an extruded tank section having an internal surface and external edges, both the internal surface and the external edges extending in a longitudinal direction from a first tank end to a second tank end, the external edges being joined to the wall;
a first planar end cap joined to the internal surface and to the wall, the first planar end cap closing the tank volume near the first tank end and arranged at a non-perpendicular angle to the wall; and
a second planar end cap joined to the internal surface and to the wall, the second planar end cap closing the tank volume near the second tank end and arranged at a non-perpendicular angle to the wall,
wherein the first planar end cap is joined to the wall near the first tank end by a straight edge of the first planar end cap and the second planar end cap is joined to the wall near the second tank end by a straight edge of the second planar end cap.

8. The heat exchanger of claim 7, wherein the first end cap is at least partially recessed from the first tank end and the second end cap is at least partially recessed from the second tank end.

9. The heat exchanger of claim 7, wherein the tank further comprises at least one mounting hole extending through the extruded tank section without passing through the internal tank volume.

10. The heat exchanger of claim 9, wherein the first planar end cap is at least partially located between the wall and the at least one mounting hole.

11. The heat exchanger of claim 9, wherein the at least one mounting hole includes a first mounting hole located between the first tank end and the first end cap and a second mounting hole located between the second tank end and the second end cap.

12. The heat exchanger of claim 7, wherein the internal surface defines a cylindrical internal surface of the tank, and wherein each of the first and second planar end caps includes a non-circular elliptical edge corresponding to a conic section of the cylindrical internal surface.

13. The heat exchanger of claim 7, wherein the first and second planar end caps are joined to the extruded tank section by weld joints located within the tank volume.

14. The tank of claim 1,
wherein the first planar end cap is disposed along a first plane and the second planar end cap is disposed along a second plane, and wherein the first plane and the second plane intersect outside of the extruded tank section.

15. The tank of claim 1,
wherein the first end cap includes a first straight edge portion, wherein the second end cap includes a second straight edge portion, and wherein the first straight edge portion and the second straight edge portion face away from the tank.

16. The tank of claim 15,
wherein the extruded tank section includes a pair of opposing tank sides, wherein each of the tank sides includes an outwardly facing side edge, and where the side edges, the first straight edge portion, and the second straight edge portion are all disposed along a single plane and together form a rectangular opening for the internal tank volume.

17. The tank of claim 15, wherein the first end cap edge is longer than the first straight edge portion and wherein the second end cap edge is longer than the second straight edge portion.

18. A heat exchanger comprising:
a core including a first core end and a second core end, a plurality of fluid flow channels extending in parallel from the first core end to the second core end, a plurality of pairs of long bars extending in parallel from the first core end to the second core end, each of the pairs of long bars at least partially defining one of the plurality of fluid flow channels, and a plurality of short bars at each of the first core end and the second core end, each of the plurality of short bars disposed along an end of one of the plurality of fluid flow channels; and
a first tank sealingly joined to the first core end, the first tank being joined to the plurality of short bars at the first core end and to the plurality of pairs of long bars at the first core end, the first tank including, a first extruded tank section extending from a first end of the first tank to a second end of the first tank, a first planar end cap joined to the first extruded tank section near the first end of the first tank, and a second planar end cap joined to the first extruded tank section near the second end of the first tank,
wherein the first end of the first tank is joined to a first one of the plurality of short bars,
wherein the second end of the first tank is joined to a second one of the plurality of short bars,
wherein the first planar end cap is joined to the first one of the plurality of short bars,
wherein the second planar end cap is joined to the second one of the plurality of short bars,
wherein the first planar end cap and the second planar end cap each have edges that are shaped to engage an internal surface of the first extruded tank section along a majority of the length of the edges and are joined to the internal surface,
wherein the first planar end cap is disposed along a first plane and the second planar end cap is disposed along a second plane, and
wherein the first plane and the second plane intersect outside of the first tank opposite of the core.

* * * * *